March 14, 1944.    A. SCHEIBE    2,344,416
PISTON
Filed Sept. 16, 1941
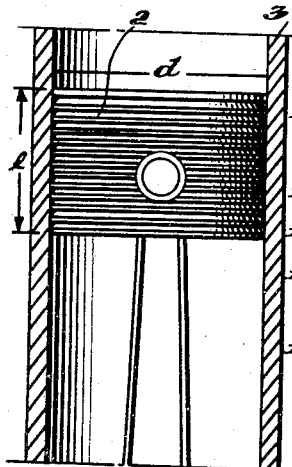
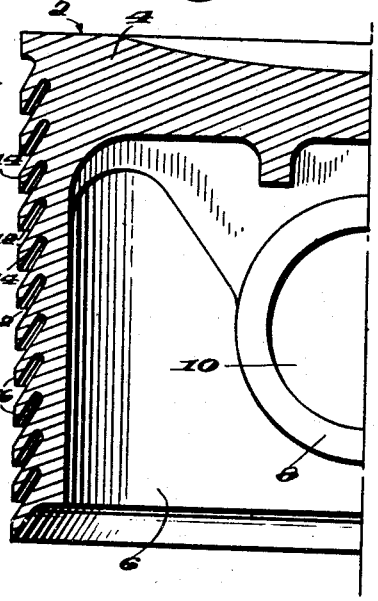
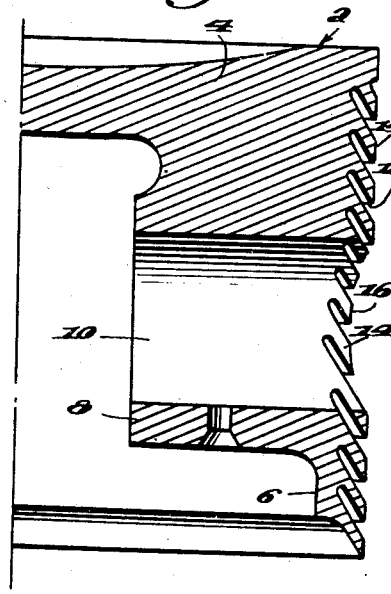
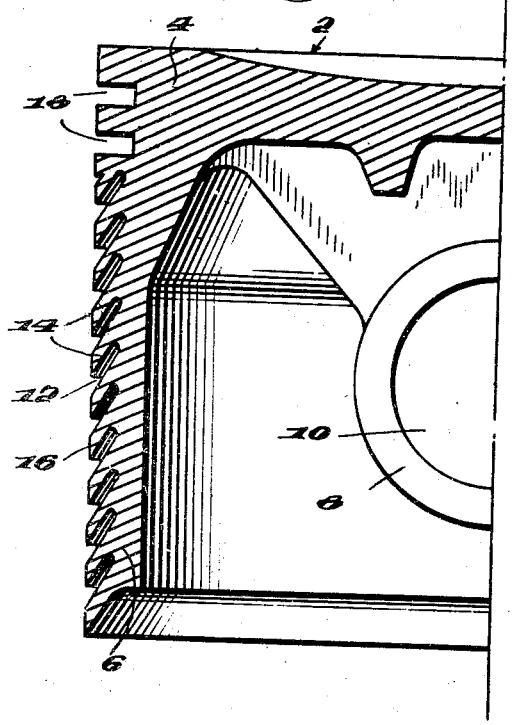
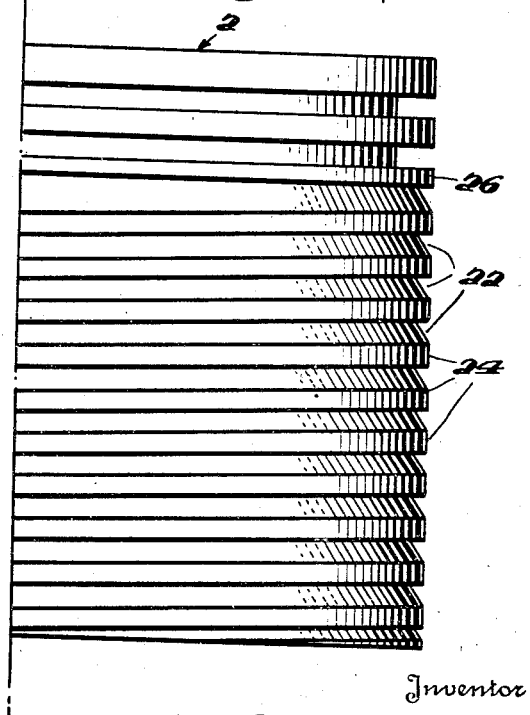
Inventor
Alfred Scheibe,
By Bailey, Stephens & Huettig
Attorney Patented Mar. 14, 1944

2,344,416

UNITED STATES PATENT OFFICE 2,344,416

PISTON

Alfred Scheibe, Dessau-Ziebigk, Germany; vested in the Alien Property Custodian

Application September 16, 1941, Serial No. 411,083
In Germany September 19, 1938

9 Claims. (Cl. 309—10)

This invention is directed to a piston for internal combustion engines, and in particular to a novel elastic heat transmitting and sealing fin construction for a piston.

This application is a continuation-in-part of my application for Piston, S. N. 290,458, filed August 16, 1939.

Pistons for internal combustion engines must fit the cylinder walls very closely in order to conserve power by preventing gas escapage from the combustion chamber, to prevent the passage of lubricating oil into the combustion chamber, and to ensure silent and low friction operation of the piston within the cylinder. High speed engines develop considerable heat and pressure upon the piston, which cause thermal expansion and distortion of the piston so that the close fit of the piston with the cylinder wall is lost, and a loss of power results. In aggravated cases injury to the piston and cylinder can occur by reason of increased friction resulting from piston expansion, which may cause the piston to seize or stick in the cylinder.

In order to prevent harmful results, known pistons are formed with two or more vertically extending slots cut entirely through the skirt of the piston to create a plurality of segments depending below the piston head. Thermal expansion of the piston is taken care of by the elasticity of these segments. However, as the piston head and the piston skirt are subjected to different thermal expansions, and to different mechanical pressures, this construction does not give a satisfactory balance between the piston head and skirt insofar as the elasticity of the skirt required to make a close fit with the cylinder wall, and the expansion necessary under heating, is concerned, and trouble in the use of the piston results.

Furthermore, in order to prevent the piston from tipping in the cylinder, prior art pistons are made with lengths greater than their diameters, and these proportions accordingly create pistons of rather large size, weight and frictional contact with the cylinder walls.

An object of this invention is to produce a piston in which the piston head and skirt are maintained in constant thermal and mechanical balance.

Another object of the invention is to construct a piston having elastic means determined with respect to the thermal expansion of the piston.

Another object of the invention is to produce a piston in which the skirt not only dissipates its own heat, but also heat developed in the piston head.

Another object of the invention is to produce a piston having a skirt which has very little frictional contact with the cylinder wall.

Another object of the invention is to produce a piston having elastic means on the skirt thereof which takes care of thermal expansion and mechanical distortion of the piston as well as provides means to prevent lubricating oil from entering into the combustion chamber of the cylinder.

Another object of the invention is to produce a piston having a length substantially equal to or less than the diameter of the piston, and which satisfactorily conducts heat to the cylinder walls while maintaining a tight oil seal and low frictional contact thereagainst.

Generally these objects of the invention are obtained by cutting into substantially the entire surface of the skirt of the piston a plurality of circumferential grooves, or a single or multiple threaded groove. The grooves are inclined inwardly toward the piston head, and form conically surfaced or bell-shaped fins from the material of the piston left therebetween. Usually the skirt is integral with the piston head and therefore heat conducted from the piston head is dissipated through the fins, which thus act in the nature of cooling fins. The ends of the fins bear upon the cylinder wall with a less bearing area, and consequently less friction, than an uncut skirt. The relative elasticity of the fins allows for expansion and distortion of the piston, while maintaining a tight fit between the piston and the cylinder wall. Furthermore, the fins in combination with the grooves take the place of the conventional piston rings.

As substantially the entire peripheral surface of the piston is tightly and resiliently supported against the cylinder wall, the piston can be given a length equal or less than its diameter without the danger of its tipping in the cylinder.

The means by which the objects of the invention are obtained are fully described in combination with the accompanying drawing, in which:

Fig. 1 is a cross-sectional view of a cylinder with a piston constructed according to this invention therein;

Fig. 2 is a cross-sectional view of a portion of a piston showing the formation of fins between circumferentially cut grooves in the piston;

Fig. 3 is a similar view of Fig. 2 turned 90°;

Fig. 4 is a view similar to Fig. 2, but showing a modified form in which the fin forming grooves are limited to the piston skirt; and Fig. 5 is a side view of a part of a piston showing the grooves cut in the form of threads.

In Fig. 1 piston 2 is shown in a cylinder 3. Because of the novel construction of piston 2, this piston has a length 1 substantially equal to or less than its diameter d, without danger of the piston tipping in the cylinder. The construction of the piston which makes this possible is more fully shown in Figs. 2 to 5, inclusive.

Piston 2 in Figs. 2 and 3 is composed of a piston head 4, an integral depending skirt 6, and internal reinforcing flanges 8, through which extends bore 10 which is adapted to receive the conventional wrist pin.

Annular grooves 12 are cut in the outer periphery of head 4 and skirt 6. As shown, these grooves cover substantially the entire peripheral surface of the piston and are inclined upwardly with respect to the vertical axis of the piston. Between adjacent grooves 12 are formed fins 14 which, because of the inclination thereof, have conical upper and lower surfaces. Ends 16 of fins 14 are the original piston surface and are adapted to bear upon the cylinder wall.

Fins 14 are sufficiently thin so that they are relatively elastic as compared with the remainder of the piston. Substantially the entire peripheral surface thus comprises a uniformly elastic portion integrally attached to the main body of the piston. Piston 2, of course, expands radially upon being heated. As the fins are inclined with respect to the vertical axis of the piston, and form an acute angle therewith, they will bend when pressed against the cylinder wall and thus obtain the full effect of their elasticity. The possibility of the piston freezing or jamming against the cylinder wall is thus considerably lessened. Heat generated in the piston head is conducted to the fins and is dissipated therefrom by the ends 16 which bear against the cylinder wall. The size of the fins is thus determined by the degree of elasticity and the radiating surface required in the operation of any particular engine it being noted that because the entire surface of the piston is covered by fins, a large surface area of the piston constitutes a heating conducting surface for transmitting heat to the cylinder wall. As ends 16 fit tightly against the cylinder wall when expanded under the heat of working conditions, the fins and grooves are sufficient to function as a packing and the conventional piston rings can be omitted from the piston. Moreover, ends 16 represent a substantial reduction in the bearing area of piston 2 against a cylinder wall, and thus the piston slides with less friction against the wall. As the piston is fitted when cold into the cylinder, enough play is left so that the fins when expanded under heat will bear with proper sealing force against the cylinder wall.

If, however, under special circumstances, it is desirable to use piston rings, they can be provided at any part of the piston body without interfering with the advantageous construction of this invention. For example, in Fig. 4, grooves 18 are formed in the head 4 of piston 2, for the reception of the conventional fire rings or piston rings. In the skirt 6 of piston 2, fins 14 are formed as shown in Fig. 2.

In Fig. 5, a modified manner of forming the fins is shown. Grooves 22 are cut around the outside surface of the piston in the form of a single or a multiple thread. Spiral fins 24 are thus formed between adjacent grooves.

The upper ends of the grooves are closed at 26 in order to seal them from the combustion chamber. As in Fig. 2, grooves 22 are inclined with respect to the vertical axis of the cylinder, and fins 24 function similar to fins 14.

The invention has advantages over prior known pistons in that the novel fins allow the pistons to expand through their elasticity while at the same time maintaining a tight sealing fit with the cylinder wall and dissipating heat conducted from the piston head. Because the fins conduct considerable heat to the cylinder wall, and at the same time keep the piston from tipping in the cylinder, the piston can have a length substantially equal to or less than the diameter of this piston. This is very advantageous in engine construction, particularly in aircraft engines, as the pistons can be made lighter and operate with less friction than ordinary pistons, and the engine can be made more compact.

Having now described a means by which the objects of this invention may be obtained, what I claim as new and desire to secure by Letters Patent is:

1. A piston having a length substantially no greater than its diameter and having a plurality of integrally formed elastic fins covering substantially the entire peripheral surface of said piston, the free ends of said fins being adapted to bear upon a cylinder wall.

2. A piston as in claim 1, said fins being inclined with respect to the vertical axis of said piston and said ends forming a resilient, heat conduction surface for said piston.

3. A piston having a length substantially no greater than its diameter, a spiral groove extending substantially the entire length of said piston in the outer peripheral surface thereof, elastic fins between the convolutions of said groove, said fins forming a resilient heat conducting, low friction surface adapted to contact a cylinder wall.

4. A piston as in claim 3, a plurality of grooves similar to said spiral groove, said plurality of grooves being in the form of a multithread.

5. A piston adapted to be used in a high speed internal combustion engine, said piston having a length substantially no greater than its diameter, a plurality of integrally attached elastic fins covering substantially the entire peripheral surface of said skirt and being inclined toward the piston head whereby the surface of said skirt is resilient radially of said piston, each of said fins constituting an oil seal, and said fins being of such a number to constitute an adequate heat dissipating means for said piston.

6. An internal combustion engine piston having a length substantially no greater than its diameter and having a plurality of integrally formed elastic fins covering substantially the entire peripheral surface of said piston, all of said fins being inclined in the same direction with respect to the longitudinal axis of said piston and overlapped in spaced relation with regard to one another.

7. A piston as in claim 6, the free ends of said fins being substantially cylindrical surfaces adapted to be collectively the bearing surface of said piston against a cylinder wall.

8. A piston as in claim 6, said fins being in sufficient number to constitute a satisfactory heat conductor from said piston to a cylinder wall, and having their free ends constituting substantially cylindrical surfaces adapted to be collectively the bearing surface of said piston against a cylinder wall.

9. A piston comprising a head and a guide rigidly attached to the head, said guide including an inner or core portion and an outer or core-encircling portion integral with said core portion, the inner or core portion being substantially inflexible and non-yielding when subjected to radially applied external forces and the outer core-encircling portion being constructed to yield when such forces are applied and expand when such forces are removed and to maintain by its resilience the cylinder wall engaging surfaces thereof in close contact with a cylinder wall at all times without danger of binding, the outer core-encircling portion of the guide being coextensive in area with the inner non-yielding core and the overall length of the piston as a whole being approximately equal to or less than its diameter.

ALFRED SCHEIBE.